US006896440B2

(12) United States Patent
Trpkovski et al.

(10) Patent No.: US 6,896,440 B2
(45) Date of Patent: May 24, 2005

(54) CONNECTOR FOR JOINING MULTIPLE PANE WINDOW SPACERS

(75) Inventors: Paul Trpkovski, Loganville, WI (US); Benjamin J. Zurn, Roseville, MN (US)

(73) Assignee: Cardinal IG Company, Eden Prairie, MN (US)

( * ) Notice: Subject to any disclaimer, the term of this patent is extended or adjusted under 35 U.S.C. 154(b) by 0 days.

(21) Appl. No.: 09/961,622

(22) Filed: Sep. 24, 2001

(65) Prior Publication Data

US 2003/0059253 A1 Mar. 27, 2003

(51) Int. Cl.[7] .................................................. F16B 12/36
(52) U.S. Cl. ..................... 403/294; 52/204.68; 403/341
(58) Field of Search ................................ 403/292, 294, 403/297, 341, 345, 353, 206; 248/244.7, 222.13; 52/210, 204.58, 204.68, 217, 204.53, 656.9

(56) References Cited

U.S. PATENT DOCUMENTS 3,105,274 A 10/1963 Armstrong
3,159,886 A 12/1964 Lynch
3,802,206 A * 4/1974 Moore et al. ............... 403/267
3,866,380 A 2/1975 Benson
4,145,150 A 3/1979 Rafeld
4,222,209 A * 9/1980 Peterson ...................... 52/172
4,357,744 A 11/1982 McKenzie et al.
4,453,855 A * 6/1984 Richter et al. .............. 403/295
4,530,195 A 7/1985 Leopold
4,608,802 A 9/1986 Bayer
4,630,959 A 12/1986 Glaser
4,657,426 A * 4/1987 Targetti ...................... 403/295
4,683,634 A 8/1987 Cole
5,048,997 A 9/1991 Peterson
5,144,780 A * 9/1992 Gieling et al. ................ 52/298
5,209,599 A 5/1993 Kronenberg
5,466,534 A * 11/1995 Newby ....................... 428/167
5,560,731 A 10/1996 Kronenberg
5,713,177 A * 2/1998 Peterson ................ 52/204.591

FOREIGN PATENT DOCUMENTS

DE 7322123 2/1974
DE 295 06 746 U1 8/1995
DE 200 14 789 U1 11/2000
WO WO9923339 5/1999

* cited by examiner

*Primary Examiner*—William L. Miller
(74) *Attorney, Agent, or Firm*—Allen W. Groenke; Fredrikson & Byrons, P.A.

(57) ABSTRACT

A connector key for joining spacer member ends in multi-pane window units. A connector key and methods for joining spacer member ends are provided. The connector key can include a top central depression, side walls having top gaps, side shoulders having channels and recesses, all providing opportunity for sealant to flow from the central depression over the side regions of the connector key. Connector keys can also have holes through the bottom floor of the central depression to the bottom of a connector key and further through bottom channels provided in the connector key. Methods are provided which include sliding a spacer member over each end of the connector key up to a central flange. Holes may be punched through the spacer material, preferably forming jagged portions which secure the spacer members to the connecting key. Sealant may be injected through the punched holes, and through the through holes in the connector key central depression floor. Injected sealant may thus flow into the central depression, over the side walls into the side recesses, and into the bottom channels. The connector key can provide temporary mechanical joinder while the sealant is curing, as well as mechanical rigidity and insulative gas sealing after curing.

10 Claims, 7 Drawing Sheets

CONNECTOR FOR JOINING MULTIPLE PANE WINDOW SPACERS

FIELD OF THE INVENTION

The present application is related generally to windows and doors. More specifically, the present application is related to spacers or frames used to separate the panes of multi-pane window units. The present invention includes a key or connector for joining together two ends of tubular spacers and methods for sealing the inserted connector and spacer.

BACKGROUND OF THE INVENTION

Multi-pane window units are well known. Multi-pane window units include insulating glass units which include at least two window panes separated by a spacer which extends around the periphery of the separated window panes. The spacer or profile is typically a tubular, substantially rectangular shaped, hollow member. The spacer is typically formed from thin sheet metal, and may be formed so as to have ribs and/or channels and fins imparted to increase the structural strength of the thin walled spacer.

Insulating glass units may be formed by combining a substantially linear, tubular, metallic spacer and two glass window panes. The insulating glass units are formed in many shapes, including rectangular, triangular, circular, arcuate, and combinations of these shapes. Rectangular shaped insulating glass units are the most common. In one method, the spacer is formed from a sheet metal strip into a substantially rectangular cross-sectional shape having a length approximately equal to the total perimeter of the glass panes to be joined. For use in a rectangular shaped insulating glass unit, the spacer can be run through a bending unit to form four substantially rectangular corners. In an illustrative example of one method, a metallic spacer member begins along the top, near the upper left corner of the insulating glass unit extends across to the upper right corner, bends to extend downward to the lower right corner, bends to extend leftward to the lower left corner, bends to extend upward to the upper left corner, and bends to extend rightward to meet the opposite end of the spacer at the top, left region of the insulating glass unit. The opposing ends of the spacer are typically joined together to form a sealed, mechanically sound joint.

A gap is inherently formed between the two abutting spacer ends. This gap may lead to unwanted gas exchange between the between pane space and the atmosphere. One path for this exchange is from the gap alongside a connector (if present), between the connector and the enclosing spacer wall, continuing into the interior of the spacer past the connector, then into the insulating gas space between the panes through the breather holes in the spacer wall. This gas exchange path is preferably very tight and long.

One connector joint is formed by inserting a mechanical connector between the abutting spacer ends, and wrapping the outward and sideward faces of the spacer with a metallic tape or metallic cap using a dedicated machine. The side edges of the spacer nearest the inward face of the spacer can be joined with sealant to the glass panes disposed on either side of the spacers. The dedicated machine can be difficult to operate and maintain.

In one method, the two spacer ends are held together in a jig, and a sealant material is injected into the spacer near the joined ends. The sealant may flow into both open spacer ends, and be allowed to cure. The resulting joint integrity may be limited by the structural strength of the sealant after curing. This method also may require a long curing time, as the facing ends of the opposite spacer may have little structural integrity until the sealant is cured.

In another method, a mechanical key or connector is inserted into both ends of the spacer. In one such method, sealant is applied into or onto the outward facing surface of the connector key and the connector key opposite arms inserted into the facing spacer openings. Each of the facing spacer members may then be crimped, thereby forcing the sealant to run from the opposite spacer openings into a central region between the two opposite spacer members. In this method, the sealant may reside primarily in the outside surface portion of the joined spacers and the joined spacers may suffer aesthetically from having been crimped. The crimping may, in some methods, also reduce the structural integrity of the joined members.

What would be desirable is an improved mechanical key or connector for joining multi-pane window spacer ends. What would be advantageous are improved methods for joining together window spacer members.

SUMMARY OF THE INVENTION

The present invention includes a connector key for joining together two tubular spacer members for spacing apart panes of multi-pane window units. The spacer members and connector keys may be considered to have an inwardly facing or inward portion disposed toward the interpane space and an outwardly facing or outward portion disposed toward the atmosphere. One connector key has a central flange for disposing the connector the same depth into each spacer end. The connector key can include an outward face having a central cavity or depression for receiving sealant, with the central depression having side walls. The side walls can have an inwardly disposed gap or recess on either side of the depression. One connector key has a side channel and a side channel floor for receiving sealant which flows from the central depression, over the side walls, over the side wall gaps, and into the side wall channels.

The connector key preferably has at least one hole extending from the central depression floor through to the inward portion of the connector key. A preferred embodiment has two holes extending from the central depression floor through to the connector key inward surface. The through holes can allow injected sealant to flow from the outwardly facing central depression to the inward face of the connector key and into the spacer interior between the connector key inward surface and the spacer wall. The connector key can also have inward face surface channels for distributing sealant along the inward surface of the connector key to better seal the connector key and the spacers. One connector key has a longitudinal channel extending on either side of the central flange, as well as transverse channels, all along the inwardly facing surface of the connector key.

The present invention includes a first connector embodiment for connecting two tubular window spacer ends, the connector comprising: an elongate body having a top face, a bottom face, at least two side faces, a first end, and an opposite second end; the elongate body extending from the first end to the opposite second end through an intermediate mid region, the body top face having a top cavity therein, the top cavity disposed between two cavity side walls each having a downwardly recessed upper region therein, wherein the body side faces each having a side channel in communication with the side wall top recess and the top cavity, for receiving sealant injected into the top cavity. In a second connector embodiment, the first connector has at least one hole extending through the body between the cavity and the bottom face. In a third connector embodiment, the second connector has at least one channel extending along the connector bottom face and in communication with the at least one hole. In a fourth connector embodiment, the third connector embodiment has the at least one channel transversely disposed between the two side faces. In a fifth connector embodiment, the first connector has a flange disposed on the bottom face.

A sixth connector embodiment is similar to the first connector embodiment, with the connector having a flange disposed on the bottom face, and having at least one hole extending through the connector on either side of the flange. In a seventh connector embodiment, the sixth connector embodiment bottom face includes a channel in communication with the at least one hole.

The present invention also includes an eighth connector embodiment, for connecting two window spacer ends, the spacer having a substantially hollow, tubular shape, the spacer having an inwardly facing wall for forming an insulating glass unit interior and an outwardly facing wall for forming an insulating glass unit exterior, the eighth connector comprising: a body shaped and dimensioned to fit within the tubular spacers, the body having two opposite ends, an inward face for facing the spacer inwardly facing wall, an outward face for facing the spacer outwardly facing wall; and at least two holes extending through the eighth connector and in communication with both the eighth connector inward face and connector outward face.

In a ninth connector embodiment, the eighth connector embodiment body has a cavity formed into the outward face and the cavity has a cavity floor, wherein the at least two holes are in communication with the cavity. In a tenth connector embodiment, the ninth connector embodiment body has at least one channel formed in the inward face and in communication with the body holes and outward cavity for receiving sealant injected into the holes. In an eleventh connector embodiment, the ninth connector embodiment body has at least two channels formed in the inward face and in communication with the body holes and outward cavity for receiving sealant injected into the holes. In a twelfth connector embodiment, the ninth connector embodiment body has at least two channels formed in the inward face and in communication with the body holes and outward cavity for receiving sealant injected into the holes, wherein the body has a longitudinal axis extending between the body opposite ends, wherein the two channels are disposed transversely to the body longitudinal axis.

The present invention also includes a thirteenth connector embodiment for connecting two tubular window spacer ends, the thirteenth connector embodiment comprising: an elongate body having a top face, a bottom face, at least two side faces, a first end section, and an opposite second end section; the elongate body extending from the first end section to the second end section through a mid region; the body top and side faces being recessed in the mid region relative to the first and second end sections; wherein the body has at least one hole extending between the bottom face and the top face, the at least one hole being in communication with the mid region recess.

In one method according to the present invention, a connector key is provided, consistent with a connector key as described above. A first end section of the connector key can be inserted into the first open end of a spacer. The connector key can be inserted until further travel is limited by the central flange. A second spacer end can be slipped over the second end section of the connector key until travel of the second spacer is also limited by the central flange. At this point, the two spacer members are both disposed over the connector key up to the central flange. The connector key is thus disposed within the interiors of the two opposing spacer members. In a preferred method, the two spacer member ends are actually opposite ends of a single spacer member which has been bent to form a rectangular frame.

In a preferred method according to the present invention, the connector key has two through holes extending from the central depression floor through to the inward surface of the connector key, each hole being disposed at an opposite end of the central depression. A hole can be punched through the metal of the spacer and into the central depression, near each end of the depression and over each through hole. The holes punched in this manner may have jagged, sheet metal protrusions caused or formed by the punching. The sheet metal protrusions can extend into the depression, preferably near the opposite ends of the depression, thereby forming a mechanical joinder of the metal spacers to the connector key. In one method, the two spacers cannot be easily pulled apart from each other after the holes have been punched.

A sealant material can be injected through a nozzle, cannula or hollow needle into the spacer holes previously formed. A sealant can be injected through the holes in the metal, into the central depression, with the sealant filling the depression, flowing through holes of the connector key and to the inward surface of the connector key. In one method, the sealant flows through connector key inward surface longitudinal and transverse channels, thereby adhering and sealing the inward surface of the connector key to the opposing metal of the spacer. In the outward region of the connector key, a sealant can flow over the depression side walls through an outwardly disposed wall gap, over the side walls into a side channel or groove area. The sealant can further flow over the depression side walls to a land area which is preferably longitudinally centrally disposed to the key, having some of each spacer extending thereover.

In one method, the injecting nozzle or a needle is extended into the depression, and near or into the through hole extending from the depression floor to the connector key inward surface. In this method, a sealant can be injected directly into the through hole and/or into the connector key inward surface area including the inward surface transverse and longitudinal channels. The sealant can thus seal the connector key and spacer at the central depression, the side channels outside of the central depression, and the inward surface of the connector key. With the sealant injected, the injecting nozzles can be withdrawn and the sealant allowed to cure. In one embodiment, the mechanical integrity at least during the curing process is provided substantially in part by the mechanical connector key disposed through the spacers.

Connection keys can have a mid region disposed between the opposite end sections, where the mid region has the inward face and side faces recessed relative to the surrounding end sections. The connector key thus provided includes a central area that is recessed relative to the enclosing spacer wall, leaving a void between the connector and the spacer wall. The void can be filled with sealant. The band of sealant thus provided can greatly reduce the gas exchange from the gap between the spacer ends and the interior space of the spacer members and insulating glass unit. The sealant can also enhance the spacer joint by providing adherence and structure to the joint

DETAILED DESCRIPTION OF THE PREFERRED EMBODIMENT

The following detailed description should be read with reference to the drawings, in which like elements in different drawings are numbered identically. The drawings, which are not necessarily to scale, depict selected embodiments and are not intended to limit the scope of the invention. Several forms of invention have been shown and described, and other forms will now be apparent to those skilled in art. It will be understood that embodiments shown in drawings and described above are merely for illustrative purposes, and are not intended to limit scope of the invention as defined in the claims which follow.

It is understood that connector keys are ultimately to be disposed within two abutting spacer ends. The spacer ends include generally a spacer wall having an inwardly facing or inward portion to face the inter-pane, insulating gas portion of an insulating glass unit. The spacer wall also has an outward portion, to face outwardly, toward the atmosphere, and likely to be further sealed. As used herein, the connector key "inward" surface refers to a portion facing toward the inter-pane space, with the connector key "outward" surface refers to a portion facing await from the inter-pane space.

Figure 1:
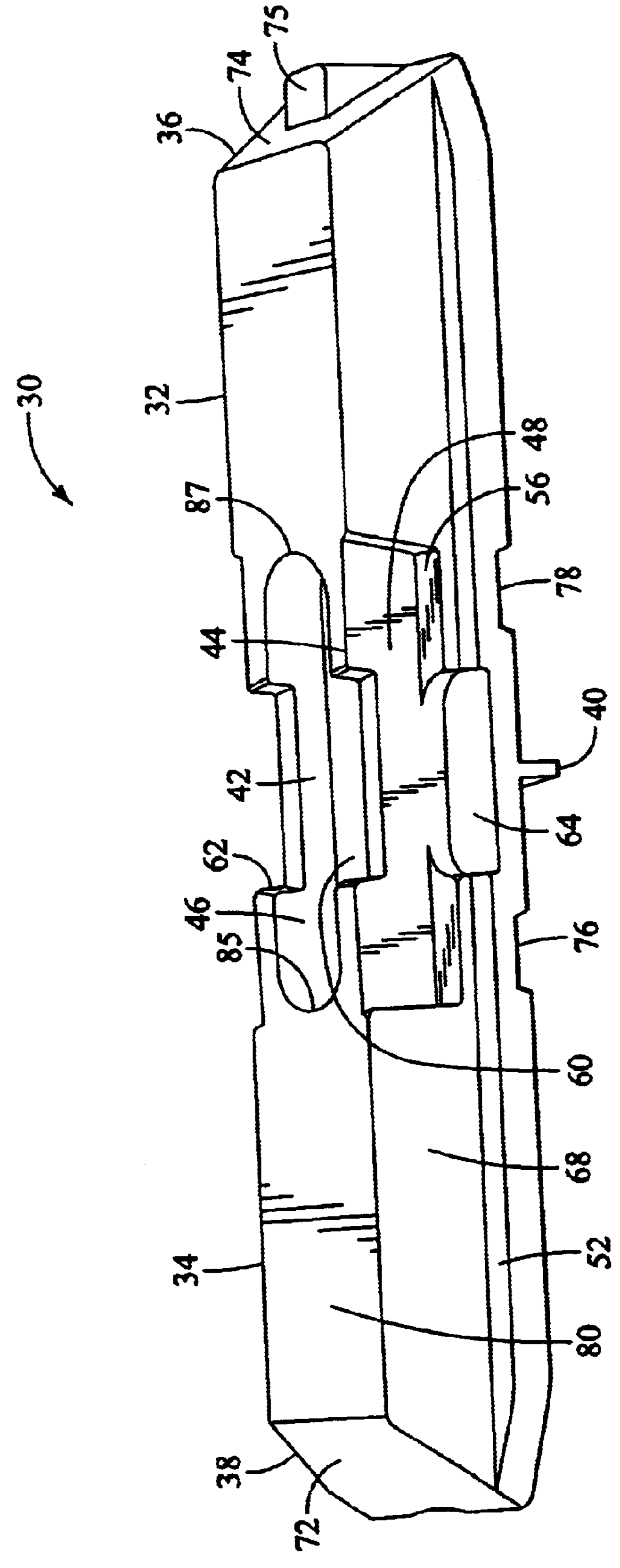
FIG. 1 is a top, side, perspective view of a connector key having an outwardly open central depression, an inward surface central flange, and a central depression side wall with outward gap and sidewall channel where the inward surface and flange can ultimately be disposed toward the interior, inter-pane space of an insulating glass unit.

FIG. 1 illustrates a spacer joint or connector key 30 having generally a right arm or first end section 39 and an opposite left arm or second end section 34. Right arm 32 includes generally a right end 36 and left arm 34 includes generally a left end 38. Connector key 30 includes a central, inward surface flange 40 extending transversely along under connector key 30 which can be used to limit the travel of connector key 30 into the spacer interior. A central channel or depression 42 is formed in the outward surface 80 of connector key 30 and includes a left outside edge 85, a right outside edge 87, a rear side wall 46, and a front side wall 44. Front side wall 44 includes a front side wall gap 60 and rear side wall 46 includes a rear side wall gap 62. Front side wall 44 includes a front side wall exterior face 48 extending down to a front side wall land 56 and having a front central side wall land recess 64 near the bottom. Connector key 30 also includes generally a front facet 68 and a front lower shoulder 52. In the rear area, a symmetrical set of lands and shoulders may also be seen, illustrated in other figures. Connector key 30 may be seen to include a left end facet 72, a right end facet 74, and a nub 75 which, in some embodiments, is an artifact of the manufacturing process. At the bottom of connector key 30, a bottom left channel 76 and a bottom right channel 78 may be seen disposed transversely to the longitudinal axis of the connector key. Gas exchange along the inward surface of the connector may be significantly restricted between flange 40 and the connector ends 36 and 38 by transversely disposed channels 76 and 78 filed with sealant.

Figure 2:
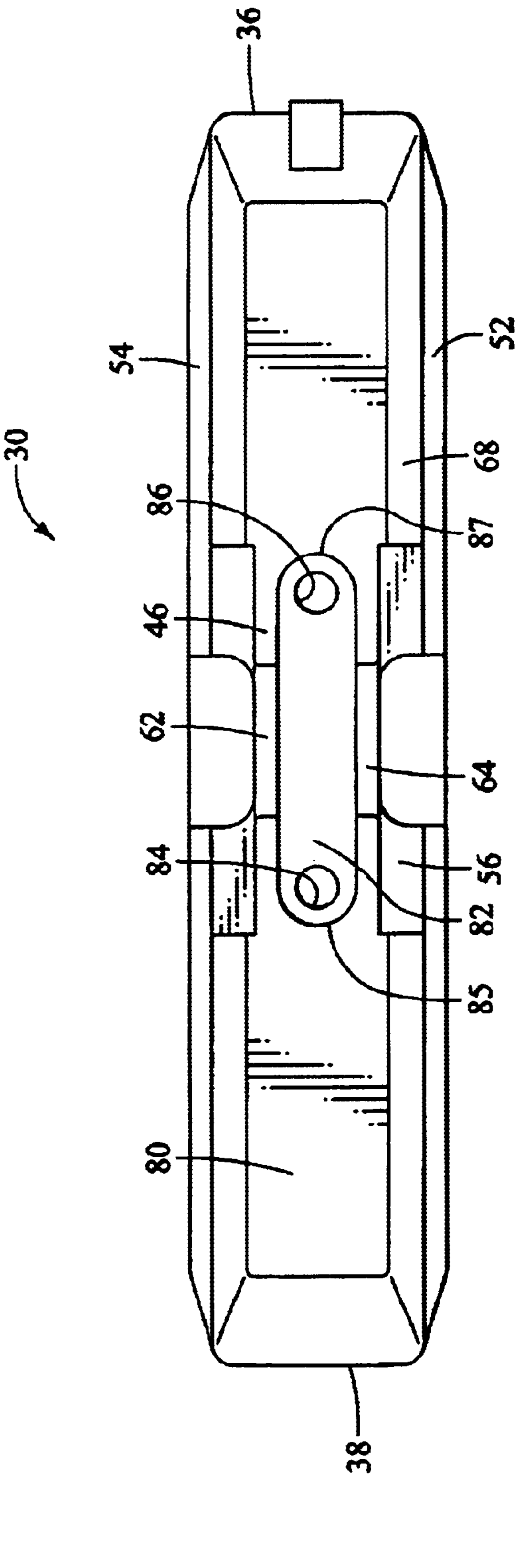
FIG. 2 is a top view of the connector key of FIG. 1, illustrating two holes extending from the central depression floor through to the connector key inward surface.

FIG. 2 illustrates connector key 30, shown from the top. Central channel or depression 42 in the outward surface 80 may be seen to include a left through hole 84 and a right through hole 86, both formed in a central channel floor 82. Front side wall land 56 and central land recess 64 are further illustrated in FIG. 2, as is front shoulder 52 and a rear shoulder 54. Rear side wall 46 may be seen to have rear side wall gap 62 near the top of the side wall. Through holes 84 and 86 may be seen to extend through connector key 30 entirely to the inward surface of the connector key. Left hole 84 and right hole 86 may be seen to be formed near left edge 85 and top right edge 87. As will be discussed further, in a later step, an enclosing sheet metal spacer man have holes punched through, driving protruding pieces of metal down over holes 84 and 86, with the protruding pieces of metal pressing against left edge 85 and right edge 87, the protruding pieces of metal will secure the mechanical location of the connector key relative to the enclosing sheet metal.

Figure 3:
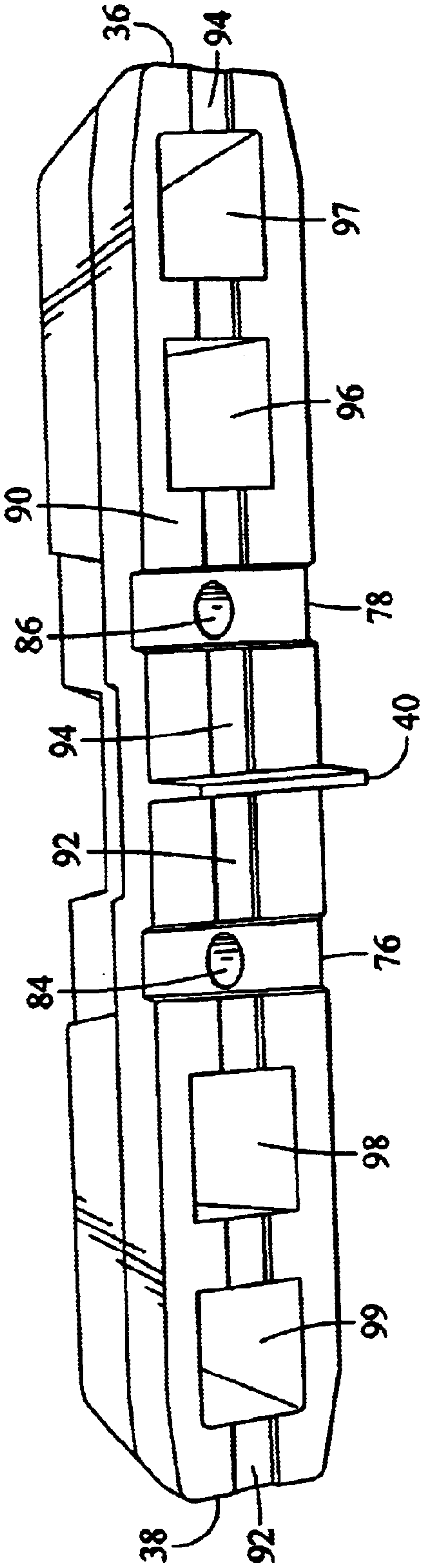
FIG. 3 illustrates a bottom, perspective view of the connector key of FIG. 1, illustrating the inward facing portion of the holes and longitudinal and transverse sealant channels in the inward surface of the connector key.

FIG. 3 illustrates connector key 30 from a bottom, perspective view. FIG. 3 illustrates generally an inward surface 90 of connector key 30. Connector key 30 may be seen to have an inward surface left longitudinal channel 92 and a right longitudinal channel 94 disposed on either side of connector key flange 40. In some embodiments, as illustrated in FIG. 3, the right longitudinal inward surface channel 94 may extend entirely through to right end 36, and left longitudinal channel 92 may extend entirely through to left end 38. Left through hole 84 may be seen to be in communication with a transverse inward surface channel 76, and through hole 86 may be seen to be in communication with an inward surface right transverse channel 78. In the embodiment illustrated, left longitudinal channel 92 is in communication with left transverse channel 76 and transverse channel 78 is in communication with longitudinal channel 94. The inward portion of connector key 30 may also be seen to have bottom indentations 99, 98, 96, and 97.

Inspection of FIG. 3 further illustrates how sealant may ultimately be disposed within and about connector key 30. Sealant injected into left through hole 84 may flow through left longitudinal channel 92 to central flange 40, and through transverse channel 76. The sealant thus injected maybe seen to form bands of sealant in channels 76 and 78, between the connector key and the enclosing spacer walls. Similarly, sealant injected through right through hole 86 may be seen to flow through right longitudinal channel 94 to central flange 40, and through transverse channel 78. The bottom of connector key 30 may, thus be seen to be well sealed to any enclosing spacer member after the sealant has been injected. In some embodiments, longitudinal channels 92 and 94 may be at least partially occluded by a central, indented channel formed into the spacer. In one embodiment, longitudinal channels 92 and 94 slidably receive a longitudinal indent or groove in the spacer, the groove having breathing or ventilation holes along its length.

Figure 4:
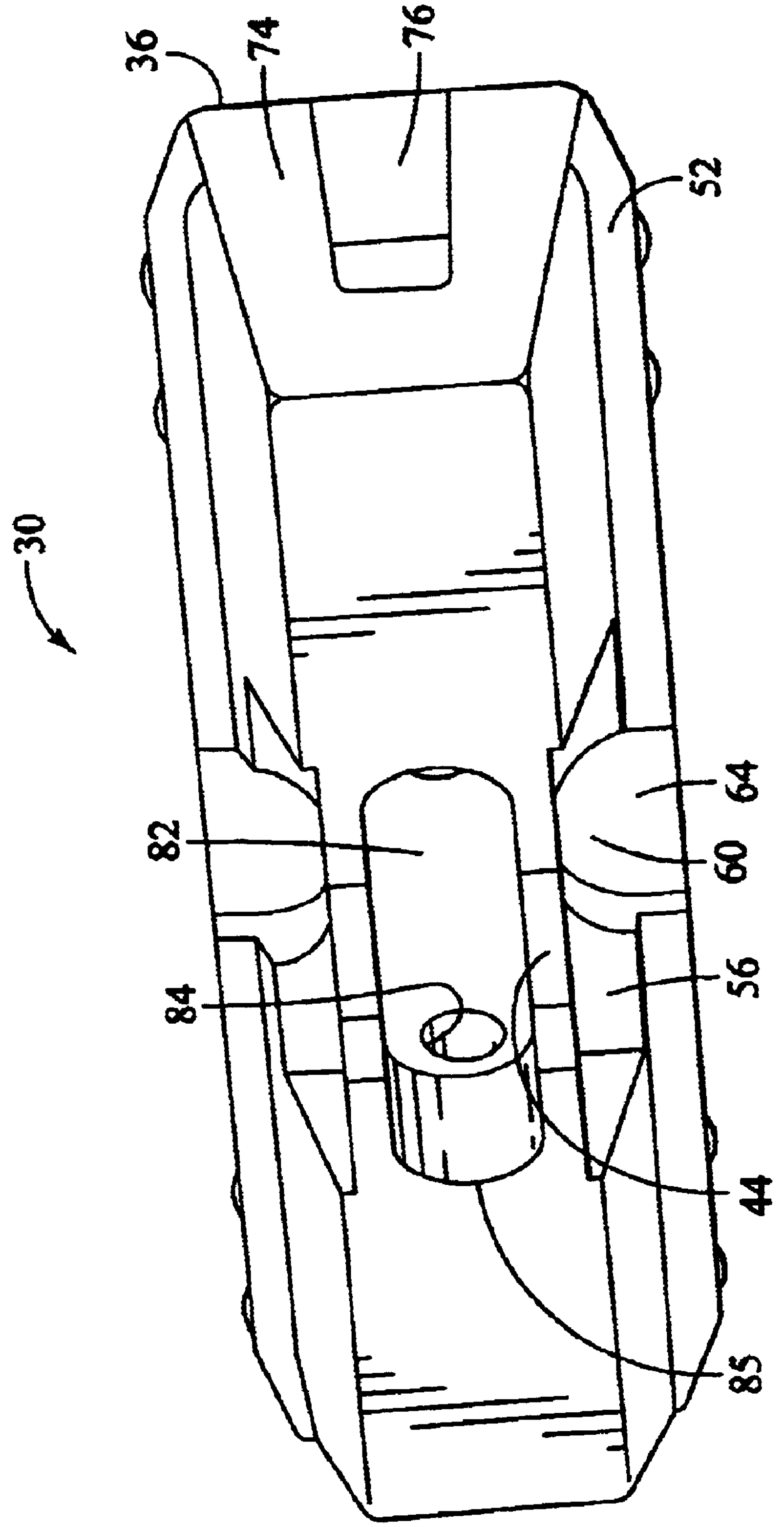
FIG. 4 is a top, end, perspective view of the connector key of FIG. 1.

FIG. 4 illustrates connector key 30 as viewed from the top, right end. Right end facet 74 and front land recess 64 may be better viewed in FIG. 4. Central recess or depression floor 82, left through hole 84, and left top edge 85 are further illustrated.

Figure 5:
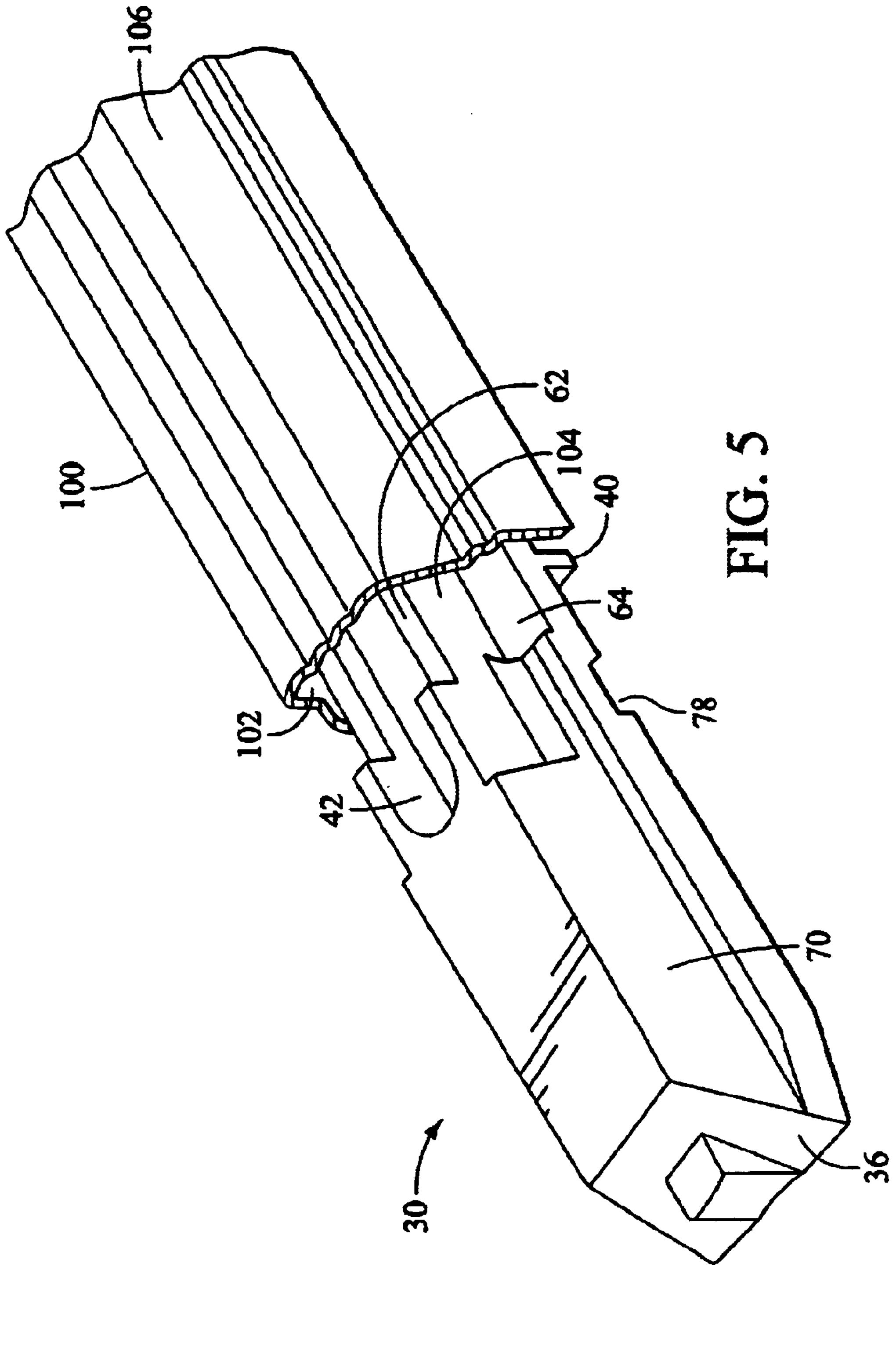
FIG. 5 is fragmentary, top, end, perspective view of the connector key of FIG. 1 inserted up to the central flange in a first spacer profile.

FIG. 5 illustrates connector key 30 having the connector key left end inserted into a first spacer member 100 having a first spacer lumen or interior 102 within. First spacer 100 may be seen to have a side facet 106 which may be seen to fit rather closely over connector key 30 rear facet 70, away from central cavity 42. A central void 104 may be seen to be formed between first spacer facet 106 and connector key 30 in the area of central land recess 64, providing space for sealant to flow against the interior of the spacer member. Connector key 30 may be seen to be inserted up to central flange 40, which limits the travel of the connector key into first spacer member 100. Sealant, later injected through the top or outward surface of first spacer member 100, may be visualized to fill central channel 42, spilling over rear side wall gap 62 into central land recess 64 and into void 104. Sealant, injected into a through hole to the outside surface of connector key 30, may flow through connector inside surface transverse right channel 78 and toward the side of the connector key 30. FIG. 5 thus illustrates how a sealant may flow through and around connector key 30 and within first spacer member 100.

Figure 6:
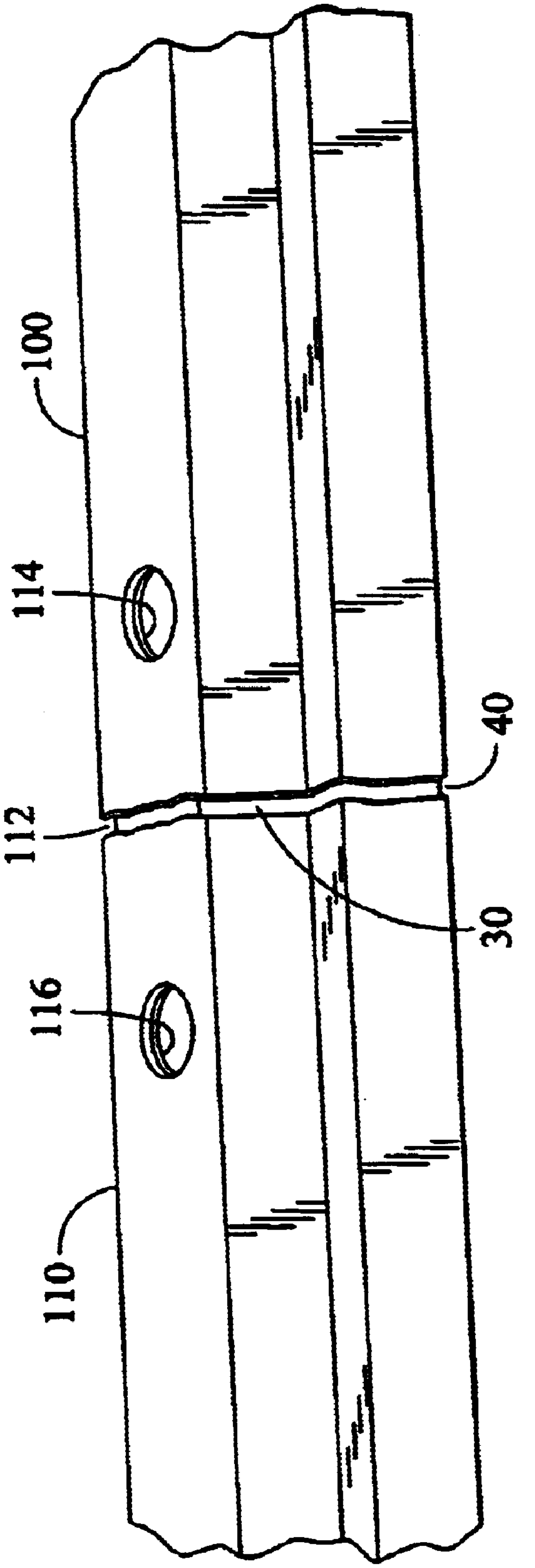
FIG. 6 is fragmentary, perspective vies of the connector key and spacer profile of FIG. 5, further having a second spacer profile inserted over the connector key up to the central flange, and having holes punched through the spacer profile outward surfaces into the connector key central depression.

FIG. 6 illustrates connector key 30 and first spacer member 100 having a second spacer member 110 slipped over connector key 30 up to central flange 40. A gap 112 may be seen to be formed between first spacer member 100 and second spacer member 110, having a gap which may approximately be equal to the width of flange 40. FIG. 6 also illustrates holes 114 and 116 punched through the spacer members 100 and 110 into the central depression 42 (not visible in FIG. 6) of connector key 30. In some methods, the holes are punched so as to force protruding pieces of profile into the depression. In one method, the profiles are formed of a sheet metal material, and protruding jagged pieces of sheet metal are forced into and against the opposite edges of the central depression 42 of spacer 30. As may be visualized with respect to FIG. 6, with the jagged pieces of metal bearing against the outside left edge 85 and outside right edge 87 (not illustrated in FIG. 6), the joint is at least partially mechanically secured by the formation of the punched holes.

Figure 7:
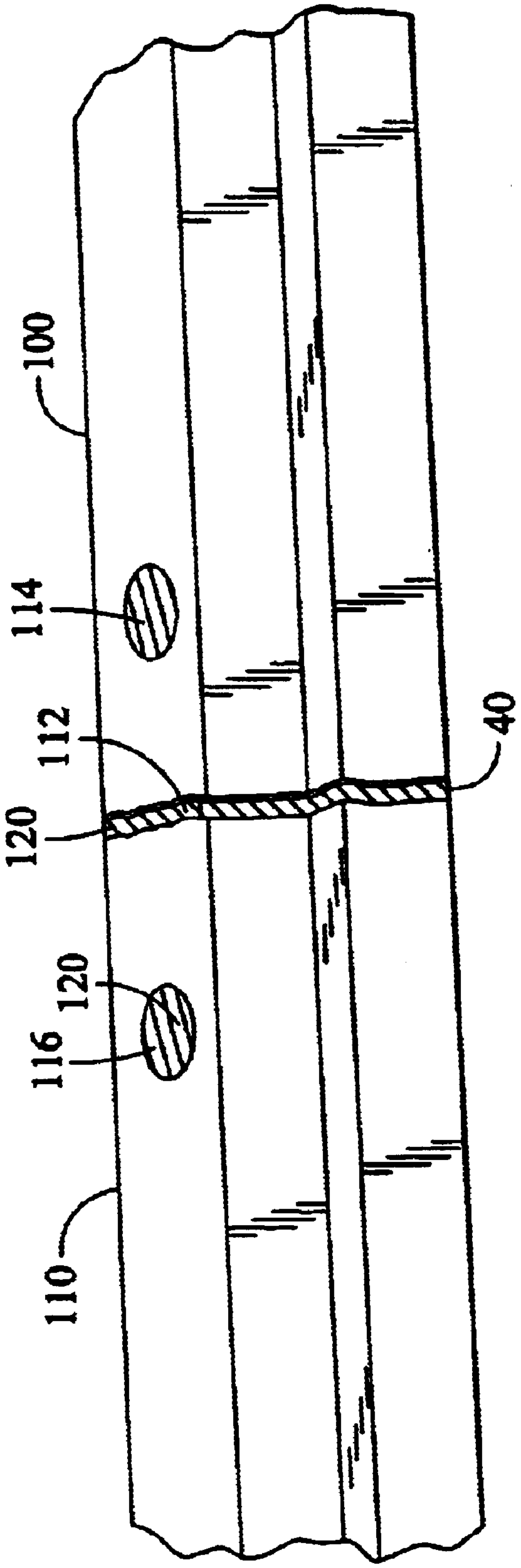
FIG. 7 is a fragmentary, perspective view of the punched spacer profiles and connector key of FIG. 6, after sealant has been injected from the outward surface through the punched holes, into the connector key depression, and into the gap between the joined spacer profiles.

FIG. 7 illustrates the joinder of first spacer member 100 and second spacer member 110 after injection of sealant into holes 114 and 116. Sealant, represented at 120, may be seen to fill holes 114 and 116 and may be seen to substantially fill gap 112. In one method, a nozzle or hollow needle is used to inject sealant through holes 114 and 116 into central depression 42. In some methods, the injecting nozzle is forced near or even within the through holes in connector 30 to better insure flow of sealant through the through holes and to the inward surface of the connector. As previously discussed, injecting sealant into the holes formed in the spacer members can fill the central depression with sealants spilling over the side wall gaps of the central depression into the central land region and void formed between the central land region and the profile side facets. The sealant may also flow into the outside surface transverse and longitudinal channels of the connector, and against the sheet metal portion of the spacer tubular member inside wall.

Any suitable material may be used for connector keys according to the present invention. In some embodiments, thermoplastic or thermoset polymeric materials are used to form the connector keys. Some suitable sealants include butyl rubber and polyisobutylene, however other sealants are within the scope of the invention. Two part, curable, and thermoset sealants may also be used. The connector keys according to the present invention may be used with any spacer members, however joining metallic spacer member is a preferred use of the present invention.

Connector keys according to present invention are preferably sized and dimensioned to fit within the spacer members they are to be utilized with. In one embodiment, the connector key is about 2 inches long, 0.43 inches wide at the inside, 0.24 inches wide at the outside, has a central depression width of 0.63 inches, and has a through hole diameter of about 0.08 inches. In one embodiment, the connector keys are formed of no. 6 nylon, 33% glass filled.

What is claimed is:

1. A connector for connecting two tubular window spacer ends, the connector comprising:

an elongate body having a top face, a bottom face, at least two side faces, a first end, and an opposite second end;

the elongate body extending from the first end to the opposite second end through an intermediate mid region, the body top face having a top cavity therein, the top cavity disposed between two cavity side walls each having a thickness and a downwardly recessed upper gap region therein for receiving sealant injected into the top cavity, wherein the recessed upper gap regions extend entirely through the side wall thickness, and wherein the upper gap regions are each disposed between two wall regions located on each side of the gap regions and having a wall height, wherein the gap regions each have a lowered height relative to the two wall regions height on either side of the gap regions.

2. A connector as recited in claim 1, wherein the connector has at least one hole extending through the body between the cavity and the bottom face.

3. A connector as in claim 2, wherein the connector has at least one channel extending along the connector bottom face and in communication with the at least one hole.

4. A connector as in claim 3, wherein the at least one channel is transversely disposed between the two side faces.

5. A connector as in claim 1, wherein the connector has a flange disposed on the bottom face.

6. A connector as in claim 1, wherein the connector has a flange disposed on the bottom face, and has at least one hole extending through the connector on either side of the flange.

7. A connector as in claim 6, wherein the connector bottom face includes a channel in communication with the at least one hole.

8. A connector for connecting two window spacer ends, the spacer having a substantially hollow, tubular shape, the spacer having an inwardly facing wall for forming an insulating glass unit interior and an outwardly facing wall for forming an insulating glass unit exterior, the connector comprising:

a body shaped and dimensioned to fit within the tubular spacers, the body having two opposite ends, an inward face for facing the spacer inwardly facing wall, an outward face for facing the spacer outwardly facing wall; and at least two holes extending through the connector and in communication with both the connector inward face and connector outward face, wherein the connector body has an outward cavity formed into the outward face and the cavity has a cavity floor, wherein the at least two holes are in communication with the outward cavity, wherein the connector body has at least two channels formed in the inward face and in communication with the body holes and outward cavity for receiving sealant injected into the holes, wherein the body has a longitudinal axis extending between the body opposite ends, wherein the two channels are disposed transversely to the body longitudinal axis.

9. A connector as in claim 8, wherein the connector body has two transverse channels extend entirely across the inward face.

10. A connector for connecting two tubular window spacer ends, the connector comprising:

an elongate body having a longitudinal axis, a top face, a bottom face, at least two side faces, a first end section, and an opposite second end section;

the elongate body extending from the first end section to the second end section through a mid region;

the body top and side faces being recessed in the mid region relative to the first and second end sections; wherein the body has at feast one hole extending between the bottom face and the top face, the at least one hole being in communication with the mid region recess, further comprising a flange disposed on the body bottom face between the first and section and the second end section and being transversely disposed relative to the longitudinal axis.

* * * * *